A. ROESCH.
CONTROLLING DEVICE.
APPLICATION FILED FEB. 24, 1917.
1,278,749.
Patented Sept. 10, 1918.
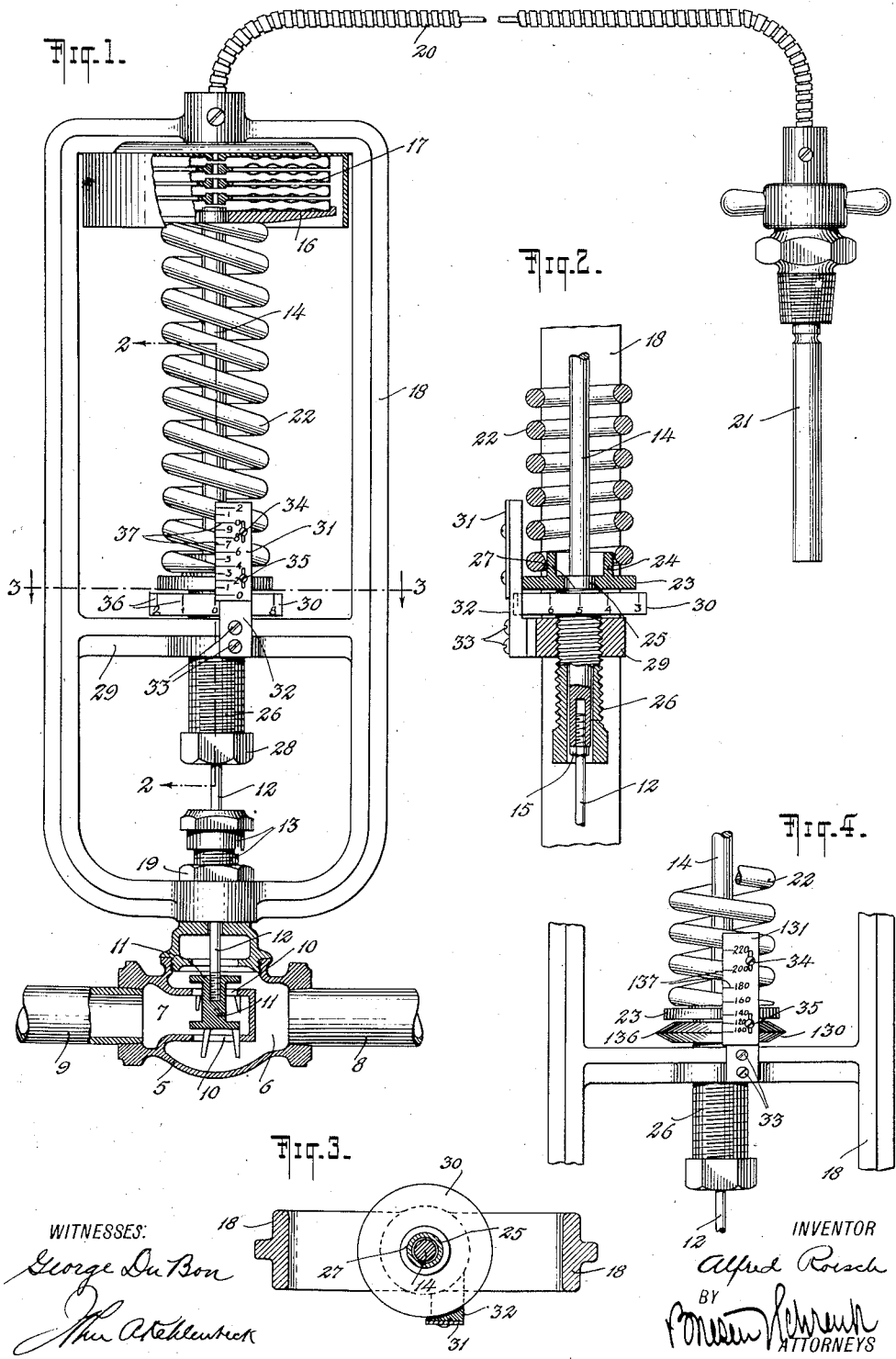
WITNESSES:
George Du Bon
INVENTOR
Alfred Roesch
BY
ATTORNEYS

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

CONTROLLING DEVICE.

1,278,749.  Specification of Letters Patent.  Patented Sept. 10, 1918.

Application filed February 24, 1917. Serial No. 150,743.

*To all whom it may concern:*

Be it known that I, ALFRED ROESCH, a citizen of the United States, and resident of the borough of Brooklyn, county of Kings, city and State of New York, have invented new and useful Improvements in Controlling Devices, of which the following is a specification.

My invention relates to controlling devices and more particularly to devices arranged to automatically control temperature, pressure and the like and has for its object to provide such apparatus with a simple and efficient adjusting means whereby it may be readily adjusted to produce the desired result and whereby the adjustment and its results are visibly indicated. Other objects of my improvement will appear from the description hereinafter and the features of novelty will be pointed out in the appended claims.

In the accompanying drawings I have shown my improvement operatively combined with an automatic temperature controlling device, it being understood that this is merely an example selected for illustrative and descriptive purposes. In said drawings Figure 1 is an elevation partly in section; Fig. 2 is a detail section on the line 2—2 of Fig. 1; Fig. 3 is a horizontal section on the line 3—3 of Fig. 1 and Fig. 4 is a detail elevation of another form of my improvement.

Referring to the drawings 5 represents a valve casing or bonnet divided interiorly into an inlet chamber 6 and an outlet chamber 7, the former being connected, for instance, by means of a pipe 8 with a source of a medium for producing temperature variations while the latter communicates with a pipe 9 leading to any point at which the temperature is to be regulated. The chambers 6 and 7 are connected with each other by means of passages 10 controlled, for instance, by a double valve 11 of any well known type and carried by a stem 12 which extends through and is slidable in the customary stuffing box or the like 13.

The stem 12 in the illustrated example is screw-threaded at its outer end for detachable connection with the internally screw-threaded end of a rod 14, a lock nut 15 being provided for preventing unintentional disconnection of these elements. At its upper end the rod 14 is connected with the closed end plate 16 of an expansible hollow member or bellows 17 which is carried by a frame 18 of suitable construction, the latter in the illustrated example being secured upon the stuffing box 13 of the valve casing 5. The stuffing box 13 which is externally screw-threaded accommodates a nut 19 whereby said frame 18 is secured in an upright position above the valve casing 5 as shown in Fig. 1 of the drawings. The interior of the member or bellows 17 is connected, for instance, by means of a flexible tube 20 with a bulb 21 containing a volatile fluid arranged to expand and contract under the influence of temperature variations, said bulb 21 in practice being located at the point at which the temperature is to be controlled and so as to be subjected to the influence of the temperature at this point. The expansion and contraction of the volatile fluid operates the member or bellows 17 in the usual way as will be more fully explained hereinafter.

Any suitable means may be included in the apparatus for resisting the expansion of the member or bellows 17 under the influence of said volatile fluid, the illustrated example showing a coil spring 22 for this purpose. The latter surrounds the rod 14 and has its one end in engagement with the end plate 16 of the bellows 17 and its other end resting upon a washer 23 provided with an upright annular flange 24 extending within said spring 22 and whereby the latter is maintained against any transverse displacement relatively to said washer 23. The latter is loosely mounted upon the reduced end 25 of an externally screw-threaded sleeve 26 and rests upon an annular shoulder 27 thereof as shown in Fig. 2, said sleeve 26 in the illustrated example having its one end provided with an integral angular head or nut 28. The said sleeve 26 passes through and is in screw-threaded engagement with a cross-bar 29 forming part of or secured to the frame 18 and loosely surrounds the rod 14 so that both the sleeve and the rod are capable of a relative movement lengthwise of each other, and the sleeve is rotatable about said rod, the purpose of which will appear more fully hereinafter. At a point above the cross-bar 29 and preferably somewhat below the annular shoulder 27, the sleeve 26 carries a disk 30 which is fixed upon or forms an integral part thereof, the periphery of said disk 30 extending into close proximity to an upright plate 31 carried by an upright support 32 which forms part of or is secured to said cross-bar 29 in any suitable manner as by means of screws 33. In the preferred arrangement the plate 31 is provided with slots 34 for the accommodation of screws 35 whereby said plate is adjustably mounted upon the support 32. The periphery of the disk 30 and the plate 31 are provided with coöperating designations 36 and 37 respectively of any suitable character, the designations in the illustrated example shown in Fig. 1 representing tenths, it being understood that the designations 36 are readable in connection with the left hand edge of the plate 31 while the designations 37 are readable in connection with the upper edge of the disk 30 in the illustrated example. In other words the disk 30 and plate 31 may be said to comprise a vernier scale of which the disk 30 is vernier and the plate 31 is the scale plate, the designations 36 and 37 being readable in combination and in the illustrated example reading hundreths.

In the operation of the device as illustrated the volatile fluid in the bulb 21 as it expands under the influence of a rise in temperature causes the bellows 17 to expand in the customary manner. As the bellows 17 is held against expansion in one direction by the one end of the frame 18, this expansive movement can only take place against the tension of the spring 22 and when it occurs serves to move the valve 11 through the medium of the rod 12 in a direction tending to close the same. As soon as the volatile fluid in the bulb 21 contracts under the influence of a drop in temperature the spring 22 serves to actuate the bellows 17 in a collapsing direction whereby the valve 11 through the medium of the rod 12 is moved in a direction away from its seat or seats. Thus as the temperature at the bulb 21 rises the valve 11 is actuated to decrease or cut off the supply of heating medium from the pipe 8 to the pipe 9 and as the temperature at said bulb drops the valve 11 is opened to either renew or increase the supply of heating medium from the pipe 8 to the pipe 9, the valve 11 being always automatically operated to maintain the temperature at the bulb 21 at a substantially constant point. The operation so far described may be said to be common to many forms of automatic controlling devices; it will be seen in the present case that the spring 22 is the factor which determines the actuation of the bellows 17. From this it follows that by adjusting the tension of the spring 22 the apparatus may be caused to substantially maintain the temperature at a given point at any desired degree. This is accomplished in the present case by rotating the disk 30 which brings about a rotation of the sleeve 26 which, owing to its screw-threaded connection with the cross-bar 29, travels in the direction of its length relatively thereto, in one direction or another this depending on the direction of rotation. The rotation of the sleeve 26 may be accomplished through the medium of the nut 28 or in any other convenient way. The described actuation of the sleeve 26 is relatively to the washer 23 and lengthwise of as well as rotatably about the rod 12 and either increases or decreases the tension of the spring 22 according to the direction in which the disk 30 is actuated as will be readily apparent.

During the adjustment above described the periphery of the disks 30 moves in close proximity to the plate 31 and at the same time the disk 30 moves lengthwise of said plate; thus it may readily be determined what extent of operation of the disk 30 is required to produce the degree of tension in the spring 22 necessary to bring about the desired temperature control. In other words the various readings of the coöperating designations 36 and 37 correspond accurately to certain degrees of temperatures, so that it is only necessary to determine by calculation or by actual tests just what those temperatures are in order to be able to accurately and quickly adjust the device to produce any predetermined temperature control. For instance, if it is found when the designation five of the disk 30 registers with the edge of the scale plate 31 and the designation six of the latter registers with the upper edge of said disk that the degree of temperature which is automatically maintained at the bulb 21 is approximately 260° F. it will indicate that the reading fifty-six hundredths represented by the combination of the two designations referred to corresponds to this degree of temperature. After this has been determined the operator need only actuate the disk 30 until the coöperating designations 36 and 37 read fifty-six hundredths each time a temperature control at 260° F. is desired. It will thus be apparent that any desired result may be accurately and efficiently predetermined in a simple manner by simply actuating the disk 30 relatively to the scale plate 31 to the desired extent, thus doing away with guess work and careful manipulation heretofore necessary and at best producing only unsatisfactory results. The adjustment of the present device may be changed as frequently as desired and may always be returned to a given point or to any desired point without any difficulty. The device is capable of minute and many adjustments and makes it possible to secure small accurate variations with no more trouble than is ordinarily required to make coarser changes.

In the form shown in Fig. 4 the disk 130 corresponding to the disk 30 is provided with a peripheral or circumferential edge 136 which coöperates with the designations 137 on the scale plate 131 which corresponds to the scale plate 31. The designations 137 represent degrees of temperature and in coöperation with the edge 136 of said disk 130 indicate the adjustment of the device or the degree of temperature which will be automatically maintained thereby at the bulb 21. This form of my improvement may otherwise be the same as the form first described and includes the same advantages as to operation and efficiency.

While I have described my improvement in connection with a temperature controlling device it is to be understood that this is not arbitrary, the arrangement being equally useful and efficient in connection with devices for automatically controlling pressure and other mediums.

My improvement in all of its forms is extremely simple in construction and operation, is not likely to become disarranged, requires no skilled attention either to operate or in the care thereof and makes it possible to secure accurate and fine adjustment with a minimum of effort.

Various changes in the specific forms shown and described may be made within the scope of the claims without departing from the spirit of my invention.

I claim:

1. In a controlling device, a controlling valve, a frame carried thereby, a bellows carried by said frame, a connection between said bellows and valve, means for operating said bellows in one direction to actuate said valve, a spring for resisting said operation of said bellows and for actuating it and said valve in a return direction, a stationary scale plate provided with designations, a sleeve in screw-threaded engagement with said frame for adjusting the tension of said spring, a disk carried by said sleeve and rotatable therewith adjacent to said scale plate and means on said disk coöperating with the designations on said scale plate to indicate said adjustment.

2. In a controlling device, a controlling valve, a frame carried thereby, a bellows carried by said frame, a connection between said bellows and valve, means for operating said bellows in one direction to actuate said valve, a spring for resisting said operation of said bellows and for actuating it and said valve in a return direction, a stationary scale plate provided with designations, a sleeve in screw-threaded engagement with said frame for adjusting the tension of said spring, a disk carried by said sleeve and rotatable therewith adjacent to said scale plate, and designations on the periphery of said disk coöperating with the designations on said scale plate to indicate said adjustment.

3. In a controlling device, a controlling valve, a frame carried thereby, a bellows carried by said frame, a connection between said bellows and valve, means for operating said bellows in one direction to actuate said valve, a spring for resisting said operation of said bellows and for actuating it and said valve in a return direction, a stationary scale plate provided with designations, a sleeve in screw-threaded engagement with said frame for adjusting the tension of said spring, a disk carried by said sleeve and rotatable therewith adjacent to said scale plate and a peripheral edge on said disk coöperating with the designations on said scale plate to indicate said adjustment.

In testimony whereof I have hereunto set my hand.

ALFRED ROESCH.